(12) United States Patent
Kondo et al.

(10) Patent No.: US 11,035,100 B2
(45) Date of Patent: Jun. 15, 2021

(54) HYDRAULIC DRIVE SYSTEM OF CONSTRUCTION MACHINE

(71) Applicant: KAWASAKI JUKOGYO KABUSHIKI KAISHA, Kobe (JP)

(72) Inventors: Akihiro Kondo, Kobe (JP); Takehisa Kato, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/647,859

(22) PCT Filed: Sep. 11, 2018

(86) PCT No.: PCT/JP2018/033617
§ 371 (c)(1),
(2) Date: Mar. 16, 2020

(87) PCT Pub. No.: WO2019/054366
PCT Pub. Date: Mar. 21, 2019

(65) Prior Publication Data
US 2020/0217046 A1 Jul. 9, 2020

(30) Foreign Application Priority Data
Sep. 15, 2017 (JP) .............................. JP2017-177344

(51) Int. Cl.
*E02F 9/22* (2006.01)
*F15B 11/02* (2006.01)
*F15B 11/17* (2006.01)

(52) U.S. Cl.
CPC .......... *E02F 9/2296* (2013.01); *E02F 9/2292* (2013.01); *E02F 9/2217* (2013.01);
(Continued)

(58) Field of Classification Search
CPC ............................... F15B 21/14; F15B 11/02; F15B 2211/20576; F15B 2211/20561; E02F 9/2217; E02F 9/2296
See application file for complete search history.

(56) References Cited

U.S. PATENT DOCUMENTS 10,024,341 B2 * 7/2018 Zhang ..................... F15B 1/024
10,233,949 B2 * 3/2019 Versteyhe ............... F15B 1/033
(Continued)

FOREIGN PATENT DOCUMENTS

JP 2016-080009 A 5/2016

*Primary Examiner* — Abiy Teka
(74) *Attorney, Agent, or Firm* — Oliff PLC

(57) ABSTRACT

A hydraulic drive system of a construction machine includes: an over-center pump connected to a turning motor; a regulator that adjusts tilting angle of the over-center pump; a main pump coupled to over-center pump; and a controller that controls the regulator such that when a turning deceleration operation is performed, the over-center pump's tilting angle decreases in accordance with decrease in a turning operation signal outputted from a turning operation device. The controller: when a pressure accumulation condition satisfied, switches a switching valve to pressure accumulation position to bring an accumulator into communication with a delivery line of the main pump; when a pressure release condition is satisfied, switches the switching valve to a pressure release position to bring accumulator into communication with a suction line of main pump; and when neither the pressure accumulation condition nor pressure release condition is satisfied, switches the switching valve to a neutral position.

8 Claims, 3 Drawing Sheets

(52) U.S. Cl.
CPC ........... *E02F 9/2235* (2013.01); *E02F 9/2267* (2013.01); *E02F 9/2282* (2013.01); *E02F 9/2285* (2013.01); *F15B 11/02* (2013.01); *F15B 11/17* (2013.01); *F15B 2211/20553* (2013.01); *F15B 2211/20576* (2013.01); *F15B 2211/6316* (2013.01); *F15B 2211/6346* (2013.01); *F15B 2211/6355* (2013.01)

(56) References Cited

U.S. PATENT DOCUMENTS

2016/0245311 A1\* 8/2016 Kajita .................. E02F 9/2292
2017/0306590 A1\* 10/2017 Kondo .................... F16H 39/42

\* cited by examiner

HYDRAULIC DRIVE SYSTEM OF CONSTRUCTION MACHINE

TECHNICAL FIELD

The present invention relates to a hydraulic drive system of a construction machine.

BACKGROUND ART

In construction machines such as hydraulic excavators and hydraulic cranes, the components thereof are driven by a hydraulic drive system. Conventionally, in such a hydraulic drive system, a hydraulic static transmission (HST) is used in a running circuit. In recent years, a hydraulic drive system in which HST is used in a turning circuit has been proposed.

In a hydraulic drive system in which HST is used in a turning circuit, an over-center pump is connected to a turning motor by a pair of supply/discharge lines in a manner to form a closed loop. The tilting angle of the over-center pump is adjusted by a regulator. In a case where the regulator moves in accordance with an electrical signal, the regulator is controlled by a controller based on a turning operation signal outputted from a turning operation device.

Patent Literature 1 discloses a hydraulic drive system in which HST is used in a turning circuit, and the hydraulic drive system is configured to be able to regenerate energy when turning deceleration is performed. In the hydraulic drive system of Patent Literature 1, the over-center pump is coupled to a main pump that supplies hydraulic oil to other hydraulic actuators different from the turning motor. When a turning deceleration operation is performed, the regulator is controlled such that the tilting angle of the over-center pump decreases in accordance with decrease in the turning operation signal outputted from the turning operation device. As a result, the over-center pump functions as a motor, and energy is regenerated from the hydraulic oil discharged from the turning motor. The regenerated energy assists the driving of the main pump.

CITATION LIST

Patent Literature

PTL 1: Japanese Laid-Open Patent Application Publication No. 2016-80009

SUMMARY OF INVENTION

Technical Problem

However, in the hydraulic drive system disclosed by Patent Literature 1, when a turning deceleration operation is performed, if no other operation is performed concurrently with the turning deceleration operation, necessary motive power for driving the main pump is small, and for this reason, the pressure at the inlet side of the over-center pump does not become sufficiently high, which causes a problem in that sufficient braking force for the turning motor is not generated.

In view of the above, an object of the present invention is to provide a hydraulic drive system of a construction machine, the hydraulic drive system having a configuration in which HST is used in a turning circuit and being capable of obtaining sufficient braking force regardless of whether or not another operation different from a turning operation is performed.

Solution to Problem

In order to solve the above-described problems, a hydraulic drive system of a construction machine according to the present invention includes: a turning operation device that outputs a turning operation signal corresponding to an inclination angle of an operating lever; a turning motor; a variable displacement over-center pump that is connected to the turning motor by a pair of supply/discharge lines in a manner to form a closed loop; a regulator that adjusts a tilting angle of the over-center pump; a main pump whose rotary shaft is coupled to a rotary shaft of the over-center pump, the main pump sucking hydraulic oil from a tank through a suction line provided with a check valve and supplying the hydraulic oil to a hydraulic actuator different from the turning motor through a delivery line; an accumulator that accumulates pressurized oil therein; a switching valve that is switched between a pressure accumulation position, in which the switching valve brings the accumulator into communication with the delivery line, a pressure release position, in which the switching valve brings the accumulator into communication with a portion of the suction line downstream of the check valve, and a neutral position, in which the switching valve shuts off the accumulator from the delivery line and the portion of the suction line downstream of the check valve; and a controller that controls the regulator and the switching valve. The controller controls the regulator such that when a turning deceleration operation is performed, the tilting angle of the over-center pump decreases in accordance with decrease in the turning operation signal outputted from the turning operation device. The controller: switches the switching valve to the pressure accumulation position when a pressure accumulation condition is satisfied, the pressure accumulation condition being defined to include that the turning deceleration operation is performed alone; switches the switching valve to the pressure release position when a pressure release condition is satisfied; and switches the switching valve to the neutral position when neither the pressure accumulation condition nor the pressure release condition is satisfied.

According to the above configuration, when the turning deceleration operation is performed, the tilting angle of the over-center pump decreases in accordance with decrease in the turning operation signal. As a result, the over-center pump functions as a motor. Therefore, energy is regenerated from the hydraulic oil discharged from the turning motor, and the regenerated energy assists the driving of the main pump. For this reason, in a case where the switching valve is positioned in the neutral position, if the turning deceleration operation is performed concurrently with another operation, the regenerated energy is directly utilized for moving a hydraulic actuator different from the turning motor. As a result, sufficient braking force for the turning motor is obtained.

When the pressure accumulation condition is satisfied (typically, when the turning deceleration operation is performed alone), since the switching valve is switched to the pressure accumulation position, even if no other operation is performed concurrently with the turning deceleration operation, the regenerated energy can be accumulated in the accumulator as pressure. In other words, by accumulating the pressure in the accumulator, the main pump is brought into the state of requiring relatively great motive power, and thereby the pressure at the outlet side of the turning motor can be increased, which makes it possible to obtain necessary braking force for the turning motor to decelerate. Thus, even if another operation different from a turning operation is not performed, sufficient braking force can be obtained.

On the other hand, when the pressure release condition is satisfied, since the switching valve is switched to the pressure release position, high-pressure hydraulic oil is supplied from the accumulator to the suction side of the main pump. Therefore, by utilizing the accumulated regenerated energy, motive power and consequently a workload to be borne by the main pump can be reduced. Thus, the present invention makes it possible to efficiently utilize the regenerated energy.

The construction machine may be a hydraulic excavator. The above hydraulic drive system may include a plurality of the main pumps that are a first main pump and a second main pump, the first main pump supplying the hydraulic oil to a boom cylinder, the second main pump supplying the hydraulic oil to an arm cylinder. The switching valve may be connected to the delivery line of the second main pump by a pressure accumulation line, and connected to the suction line of the second main pump by a pressure release line. According to this configuration, a hydraulic circuit including two main pumps that supply pressurized oil (and being suited for a middle- or large-sized hydraulic excavator) can be constructed.

The pressure accumulation condition may be defined to include that the turning deceleration operation is performed alone, and that the turning deceleration operation is performed concurrently with a boom lowering operation. According to this configuration, not only when the turning deceleration operation is performed alone, but also when the turning deceleration operation is performed concurrently with a boom lowering operation, sufficient braking force can be obtained while accumulating the regenerated energy in the accumulator.

The construction machine may be a hydraulic excavator, and the main pump may supply the hydraulic oil to a boom cylinder and an arm cylinder. According to this configuration, a hydraulic circuit including only one main pump that supplies pressurized oil, i.e., a hydraulic circuit including a less number of components (and being suited for a small-sized hydraulic excavator), can be constructed.

The pressure accumulation condition may be defined to include that the turning deceleration operation is performed alone, and that the turning deceleration operation is performed concurrently with another operation and a delivery pressure of the main pump at the time is lower than a threshold. According to this configuration, not only when the turning deceleration operation is performed alone, but also when the turning deceleration operation is performed concurrently with another particular operation, sufficient braking force can be obtained while accumulating the regenerated energy in the accumulator.

The pressure release condition may be that the turning deceleration operation is not performed and a delivery pressure of the main pump at the time is higher than a threshold (a different threshold from the threshold associated with the pressure accumulation condition). According to this configuration, the regenerated energy accumulated in the accumulator can be utilized when the load on the hydraulic actuator to which the hydraulic oil is supplied from the main pump is relatively great.

The main pump may be a variable displacement pump whose minimum delivery flow rate is set to be greater than zero. The above hydraulic drive system may further include an unloading valve provided on an unloading line that is branched off from the delivery line. The controller may fully close the unloading valve when the turning deceleration operation is performed alone. According to this configuration, when the turning deceleration operation is performed alone, bleed-off through the unloading line is interrupted, and thereby the regenerated energy can be accumulated.

Advantageous Effects of Invention

According to the present invention, with a configuration in which HST is used in a turning circuit, sufficient braking force can be obtained regardless of whether or not another operation different from a turning operation is performed.

DESCRIPTION OF EMBODIMENTS

Embodiment 1

Figure 1:
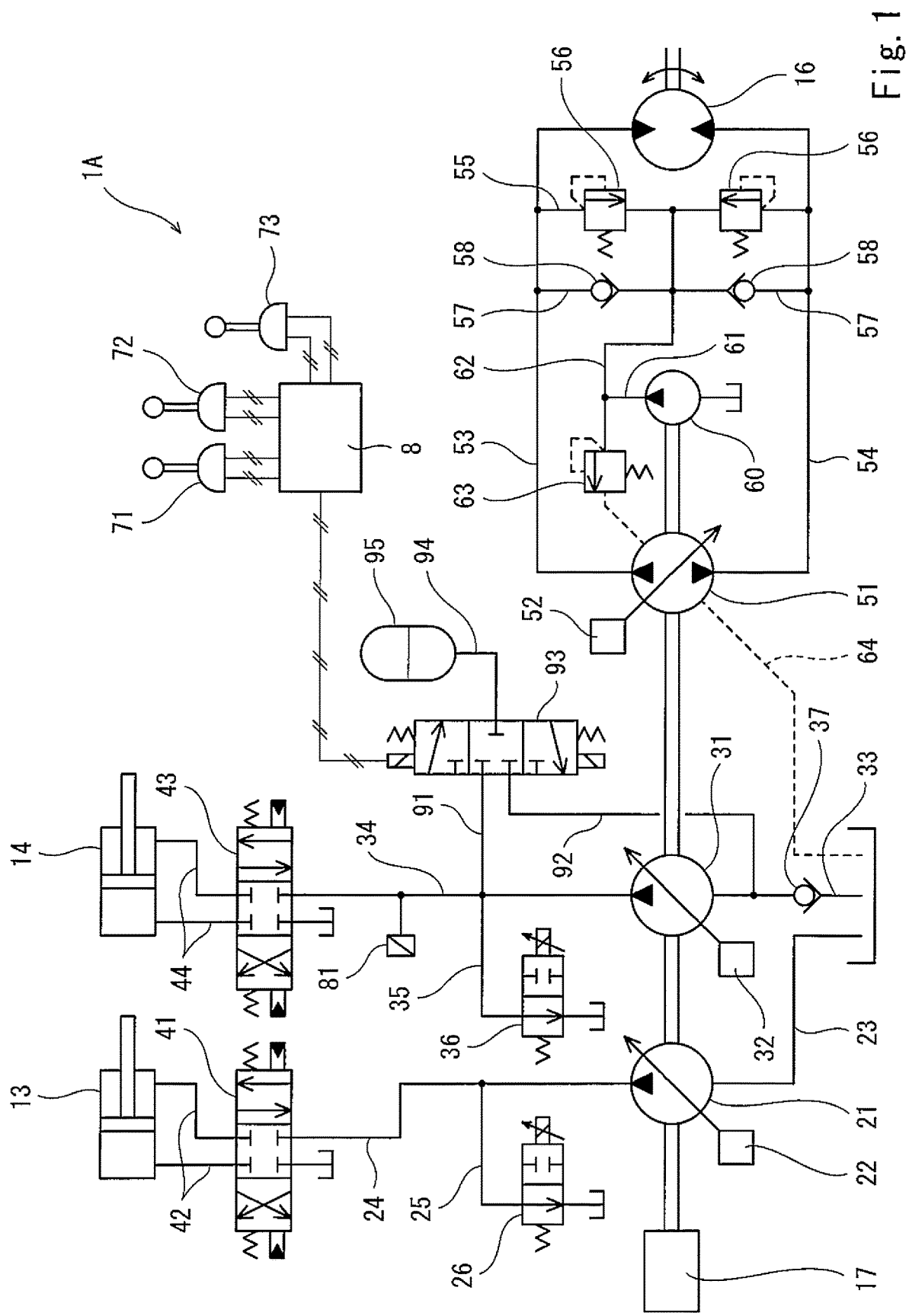
FIG. 1 shows a schematic configuration of a hydraulic drive system of a construction machine according to Embodiment 1 of the present invention.
Figure 2:
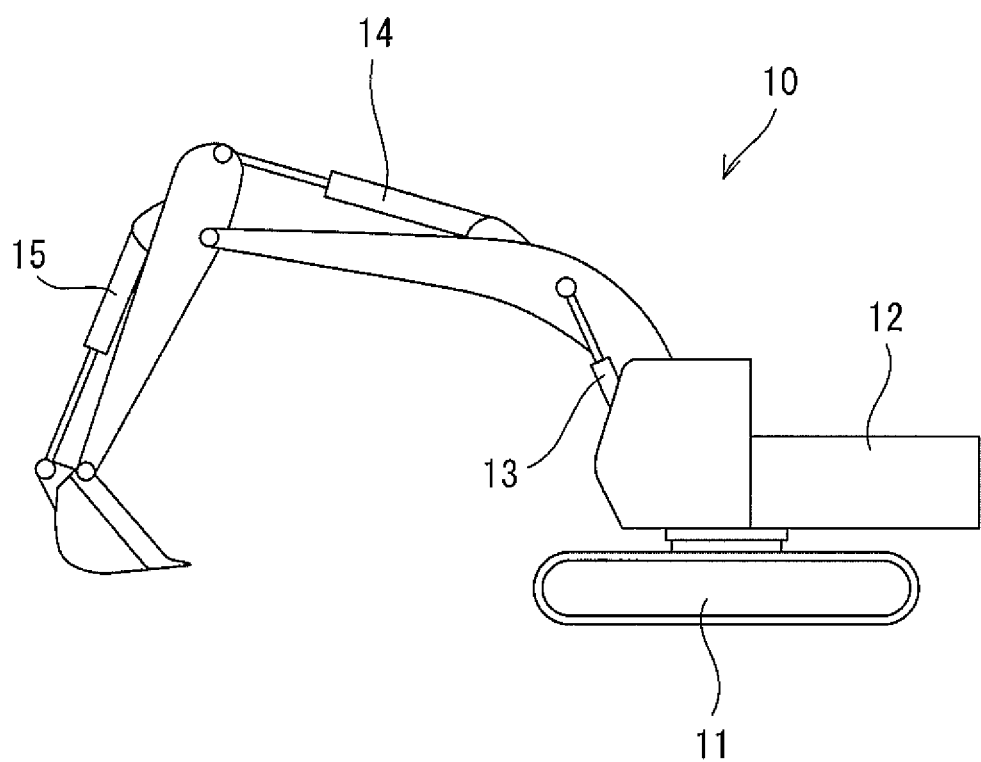
FIG. 2 is a side view of a hydraulic excavator that is one example of the construction machine.

FIG. 1 shows a hydraulic drive system 1A of a construction machine according to Embodiment 1 of the present invention. FIG. 2 shows a construction machine 10, in which the hydraulic drive system 1A is installed. Although the construction machine 10 shown in FIG. 2 is a hydraulic excavator, the present invention is also applicable to other construction machines, such as a hydraulic crane.

The construction machine 10 shown in FIG. 2 is of a self-propelled type, and includes: a running unit 11; and a turning unit 12 turnably supported by the running unit 11. The turning unit 12 is equipped with a cabin including an operator's seat. A boom is coupled to the turning unit 12. An arm is coupled to the distal end of the boom, and a bucket is coupled to the distal end of the arm. However, the construction machine 10 need not be of a self-propelled type.

In the present embodiment, a hydraulic circuit including two main pumps that supply pressurized oil is constructed, and the hydraulic circuit is suited for a middle- or large-sized hydraulic excavator. Specifically, the hydraulic drive system 1A includes, as hydraulic actuators, a boom cylinder 13, an arm cylinder 14, and a bucket cylinder 15, which are shown in FIG. 2, a turning motor 16 shown in FIG. 1, an unshown left running motor, and an unshown right running motor. The hydraulic drive system 1A further includes: an over-center pump 51 dedicated for the turning motor 16; and a first main pump 21 and a second main pump 31, which supply the hydraulic oil to other hydraulic actuators different from the turning motor 16. It should be noted that, in FIG. 1, the hydraulic actuators other than the turning motor 16, the boom cylinder 13, and the arm cylinder 14 are not shown for the purpose of simplifying the drawing.

The rotary shafts of the over-center pump 51, the first main pump 21, and the second main pump 31 are coupled to each other. The rotary shafts of the over-center pump 51, the first main pump 21, and the second main pump 31 are also coupled to the output shaft of an engine 17. That is, the over-center pump 51, the first main pump 21, and the second main pump 31 are driven by the same engine 17.

Each of the first main pump 21 and the second main pump 31 is a variable displacement pump (swash plate pump or bent axis pump) whose tilting angle is changeable. The tilting angle of the first main pump 21 is adjusted by a regulator 22. The tilting angle of the second main pump 31 is adjusted by a regulator 32. It should be noted that the minimum delivery flow rate of each of the first main pump 21 and the second main pump 31 is set to be greater than zero.

Each of the regulators 22 and 32 moves in accordance with, for example, an electrical signal. For example, in a case where the main pump (21 or 31) is a swash plate pump, the regulator (22 or 32) may electrically change the hydraulic pressure applied to a servo piston coupled to the swash plate of the main pump, or may be an electric actuator coupled to the swash plate of the main pump.

In the present embodiment, the first main pump 21 supplies the hydraulic oil to the boom cylinder 13 and the unshown left running motor, and the second main pump 31 supplies the hydraulic oil to the arm cylinder 14 and the unshown right running motor. Alternatively, both the first main pump 21 and the second main pump 31 may supply the hydraulic oil to the boom cylinder 13. In this case, when boom lowering is performed, desirably, the hydraulic oil is supplied to the boom cylinder 13 only from the first main pump 21. Similarly, both the first main pump 21 and the second main pump 31 may supply the hydraulic oil to the arm cylinder 14. Whichever one of the first main pump 21 and the second main pump 31 may supply the hydraulic oil to the bucket cylinder 15 (see FIG. 2).

The first main pump 21 is connected to a tank by a suction line 23, and also connected to a boom control valve 41 and an unshown left running control valve by a delivery line 24. The boom control valve 41 is connected to the boom cylinder 13 by a pair of supply/discharge lines 42. That is, the first main pump 21 sucks the hydraulic oil from the tank through the suction line 23, and supplies the hydraulic oil to the boom cylinder 13 through the delivery line 24, the boom control valve 41, and one of the supply/discharge lines 42.

The delivery pressure of the first main pump 21 is kept to a relief pressure or lower by an unshown relief valve. An unloading line 25 is branched off from the delivery line 24, and the unloading line 25 is provided with an unloading valve 26.

The second main pump 31 is connected to the tank by a suction line 33, and also connected to an arm control valve 43 and an unshown right running control valve by a delivery line 34. The arm control valve 43 is connected to the arm cylinder 14 by a pair of supply/discharge lines 44. That is, the second main pump 31 sucks the hydraulic oil from the tank through the suction line 33, and supplies the hydraulic oil to the arm cylinder 14 through the delivery line 34, the arm control valve 43, and one of the supply/discharge lines 44.

The delivery pressure of the second main pump 31 is kept to a relief pressure or lower by an unshown relief valve. An unloading line 35 is branched off from the delivery line 34, and the unloading line 35 is provided with an unloading valve 36.

As a result of a boom operation device 71 being operated, the boom control valve 41 is switched from a neutral position to a boom raising movement position or a boom lowering movement position. In the present embodiment, the boom control valve 41 is a hydraulic pilot-type valve, and includes a pair of pilot ports. Alternatively, the boom control valve 41 may be a solenoid pilot-type valve.

The boom operation device 71 includes an operating lever, and outputs a boom operation signal corresponding to the inclination angle of the operating lever. Specifically, the boom operation signal outputted from the boom operation device 71 increases in accordance with increase in the inclination angle (i.e., operating amount) of the operating lever.

In the present embodiment, the boom operation device 71 is an electrical joystick that outputs an electrical signal as the boom operation signal. The boom operation signal outputted from the boom operation device 71 is inputted to a controller 8. For example, the controller 8 is a computer including a CPU and memories such as a ROM and RAM. The CPU executes a program stored in the ROM.

The controller 8 controls the boom control valve 41 via an unshown pair of solenoid proportional valves, such that the opening area of the boom control valve 41 is adjusted to an opening area corresponding to the boom operation signal. Alternatively, the boom operation device 71 may be a pilot operation valve that outputs a pilot pressure as the boom operation signal. In this case, the pilot ports of the boom control valve 41 are connected, by pilot lines, to the boom operation device 71, which is a pilot operation valve. In the case where the boom operation device 71 is a pilot operation valve, the pilot pressure outputted from the boom operation device 71 is detected by a pressure sensor, and inputted to the controller 8.

The controller 8 also controls the above-described regulator 22 and unloading valve 26. It should be noted that FIG. 1 shows only part of signal lines for simplifying the drawing. Normally, the controller 8 controls the regulator 22 and the unloading valve 26, such that the delivery flow rate of the first main pump 21 increases and the opening area of the unloading valve 26 decreases in accordance with increase in the boom operation signal.

As a result of an arm operation device 72 being operated, the arm control valve 43 is switched from a neutral position to an arm crowding movement position or an arm pushing movement position. In the present embodiment, the arm control valve 43 is a hydraulic pilot-type valve, and includes a pair of pilot ports. Alternatively, the arm control valve 43 may be a solenoid pilot-type valve.

The arm operation device 72 includes an operating lever, and outputs an arm operation signal corresponding to the inclination angle of the operating lever. Specifically, the arm operation signal outputted from the arm operation device 72 increases in accordance with increase in the inclination angle (i.e., operating amount) of the operating lever.

In the present embodiment, the arm operation device 72 is an electrical joystick that outputs an electrical signal as the arm operation signal. The arm operation signal outputted from the arm operation device 72 is inputted to the controller 8.

The controller 8 controls the arm control valve 43 via an unshown pair of solenoid proportional valves, such that the opening area of the arm control valve 43 is adjusted to an opening area corresponding to the arm operation signal. Alternatively, the arm operation device 72 may be a pilot operation valve that outputs a pilot pressure as the arm operation signal. In this case, the pilot ports of the arm control valve 43 are connected, by pilot lines, to the arm operation device 72, which is a pilot operation valve. In the case where the arm operation device 72 is a pilot operation valve, the pilot pressure outputted from the arm operation device 72 is detected by a pressure sensor, and inputted to the controller 8.

The controller 8 also controls the above-described regulator 32 and unloading valve 36. Normally, the controller 8 controls the regulator 32 and the unloading valve 36, such that the delivery flow rate of the second main pump 31 increases and the opening area of the unloading valve 36 decreases in accordance with increase in the arm operation signal.

The aforementioned over-center pump 51 is a variable displacement pump whose tilting angle is changeable in both directions relative to the axial direction. The tilting angle of the over-center pump 51 is adjusted by a regulator 52. In the present embodiment, the over-center pump 51 is a swash plate pump whose swash plate can be tilted from the center to both sides. That is, the angle of the swash plate relative to the center is the tilting angle. Alternatively, the over-center pump 51 may be a bent axis pump whose tilted axis is tiltable from the center to both sides.

The over-center pump 51 is connected to the turning motor 16 by a pair of supply/discharge lines 53 and 54 in a manner to form a closed loop. The supply/discharge lines 53 and 54 are connected to each other by a bridging passage 55. The bridging passage 55 is provided with a pair of relief valves 56, which are directed opposite to each other. A portion of the bridging passage 55 between the relief valves 56 is connected to a relief valve 63 by a relief line 62.

The setting pressure of the relief valve 63 is set to be sufficiently lower than the setting pressure of the relief valves 56 provided on the bridging passage 55. A tank line 64 extends from the relief valve 63 to the tank. In the present embodiment, the tank line 64 doubles as a drain line of the over-center pump 51.

Each of the supply/discharge lines 53 and 54 is connected to the relief line 62 by a corresponding one of bypass lines 57. Alternatively, the pair of bypass lines 57 may be provided on the bridging passage 55 in a manner to bypass the pair of relief valves 56, respectively. The bypass lines 57 are provided with check valves 58, respectively.

The relief line 62 is further connected to a charge pump 60 by a replenishment line 61. The charge pump 60 is intended for replenishing the supply/discharge lines 53 and 54 with the hydraulic oil via the check valves 58. The charge pump 60 is coupled to the over-center pump 51, and driven by the engine 17. Alternatively, the charge pump 60 may be directly coupled to the engine 17.

The regulator 52 moves in accordance with an electrical signal. For example, the regulator 52 may electrically change the hydraulic pressure applied to a servo piston coupled to the swash plate of the over-center pump 51, or may be an electric actuator coupled to the swash plate of the over-center pump 51. A turning operation signal outputted from a turning operation device 73 is inputted to the controller 8, and the controller 8 controls the regulator 52 based on the turning operation signal.

The turning operation device 73 includes an operating lever, and outputs a turning operation signal (right turning operation signal or left turning operation signal) corresponding to the inclination angle of the operating lever. Specifically, the turning operation signal outputted from the turning operation device 73 increases in accordance with increase in the inclination angle (i.e., operating amount) of the operating lever.

The controller 8 controls the regulator 52, such that the delivery flow rate of the over-center pump 51 in a direction corresponding to the type of the turning operation signal (right turning operation signal or left turning operation signal) increases in accordance with increase in the turning operation signal.

When a turning deceleration operation is performed (i.e., when the turning operation signal decreases), the controller 8 controls the regulator 52, such that the tilting angle of the over-center pump 51 decreases in accordance with decrease in the turning operation signal outputted from the turning operation device 73. As a result, the over-center pump 51 functions as a motor (a surplus amount of hydraulic oil is discharged through one relief valve 56). Therefore, energy is regenerated from the hydraulic oil discharged from the turning motor 16, and the regenerated energy assists the driving of the first main pump 21 and the second main pump 31.

The present embodiment further adopts a configuration for accumulating the regenerated energy by utilizing the second main pump 31.

Specifically, the suction line 33 of the second main pump 31 is provided with a check valve 37. A portion of the suction line 33 downstream of the check valve 37 is connected to a switching valve 93 by a pressure release line 92. The switching valve 93 is connected to the delivery line 34 by a pressure accumulation line 91, and connected to an accumulator 95 by a relay line 94. The accumulator 95 accumulates the pressurized oil therein.

The switching valve 93 is switched between a neutral position, a pressure accumulation position (upper position in FIG. 1), and a pressure release position (lower position in FIG. 1). When the switching valve 93 is in the neutral position, the switching valve 93 blocks the pressure accumulation line 91, the pressure release line 92, and the relay line 94 to shut off the accumulator 95 from the delivery line 34 and the portion of the suction line 33 downstream of the check valve 37. When the switching valve 93 is in the pressure accumulation position, the switching valve 93 connects the pressure accumulation line 91 to the relay line 94 to bring the accumulator 95 into communication with the delivery line 34. When the switching valve 93 is in the pressure release position, the switching valve 93 connects the relay line 94 to the pressure release line 92 to bring the accumulator 95 into communication with the portion of the suction line 33 downstream of the check valve 37.

The switching valve 93 is controlled by the controller 8. The controller 8 determines whether or not a pressure accumulation condition is satisfied, and determines whether or not a pressure release condition is satisfied. When the pressure accumulation condition is satisfied, the controller 8 switches the switching valve 93 to the pressure accumulation position. When the pressure release condition is satisfied, the controller 8 switches the switching valve 93 to the pressure release position. When neither the pressure accumulation condition nor the pressure release condition is satisfied, the controller 8 switches the switching valve 93 to the neutral position.

In the present embodiment, the pressure accumulation condition is defined to include that a turning deceleration operation is performed alone, and that a turning deceleration operation is performed concurrently with a boom lowering operation. It should be noted that since operation signals outputted from an unshown bucket operation device, an unshown left running operation device, and an unshown right running operation device are also inputted to the controller 8, the controller 8 can determine whether or not the pressure accumulation condition is satisfied based on all the operation signals inputted to the controller 8. When the pressure accumulation condition is satisfied, the controller 8 fully closes the unloading valve 36. Alternatively, the pressure accumulation condition may be that a turning deceleration operation is performed and the delivery pressure of the second main pump 31 at the time is lower than a threshold γ. In this case, the state of the operation devices other than the turning operation device 73 need not be inputted to the controller 8.

The controller 8 is electrically connected to a pressure sensor 81 provided on the delivery line 34. The pressure sensor 81 detects the delivery pressure of the second main pump 31. The pressure release condition is that the turning deceleration operation is not performed and the delivery pressure of the second main pump 31 detected by the pressure sensor 81 at the time is higher than a threshold α (which is different from the aforementioned threshold γ). However, the pressure release condition is not limited to such a condition, but may be a condition that a particular operation is performed. When the pressure release condition is satisfied, the controller 8 controls the regulator 32 in a normal manner.

As described above, in the hydraulic drive system 1A of the present embodiment, when the turning deceleration operation is performed, energy is regenerated from the hydraulic oil discharged from the turning motor 16, and the regenerated energy assists the driving of the first main pump 21 and the second main pump 31. In a case where the turning deceleration operation is performed concurrently with a boom raising operation, an arm operation, a bucket operation, or a running operation, the switching valve 93 is positioned in the neutral position. Accordingly, the regenerated energy is directly utilized for moving a hydraulic actuator different from the turning motor 16. As a result, sufficient braking force for the turning motor 16 is obtained.

When the pressure accumulation condition is satisfied (i.e., when the turning deceleration operation is performed alone, or when the turning deceleration operation is performed concurrently with a boom lowering operation), since the switching valve 93 is switched to the pressure accumulation position, even if no other operation is performed concurrently with the turning deceleration operation, the regenerated energy can be accumulated in the accumulator 95 as pressure. In other words, by accumulating the pressure in the accumulator 95, the second main pump 31 is brought into the state of requiring relatively great motive power, and thereby the pressure at the outlet side of the turning motor 16 can be increased, which makes it possible to obtain necessary braking force for the turning motor 16 to decelerate. Thus, even if another operation different from a turning operation is not performed, sufficient braking force can be obtained.

On the other hand, when the pressure release condition is satisfied, since the switching valve 93 is switched to the pressure release position, high-pressure hydraulic oil is supplied from the accumulator 95 to the suction side of the second main pump 31. Therefore, by utilizing the accumulated regenerated energy, motive power and consequently a workload to be borne by the second main pump 31 can be reduced. Thus, the present embodiment makes it possible to efficiently utilize the regenerated energy.

It should be noted that the pressure accumulation condition may only be that a turning deceleration operation is performed alone. In this case, however, when the turning deceleration operation is performed concurrently with a boom lowering operation, the braking force becomes insufficient. Therefore, if the pressure accumulation condition is set as in the present embodiment, not only when the turning deceleration operation is performed alone, but also when the turning deceleration operation is performed concurrently with a boom lowering operation, sufficient braking force can be obtained while accumulating the regenerated energy in the accumulator 95.

Further, in the present embodiment, the pressure release condition is that the turning deceleration operation is not performed and the delivery pressure of the second main pump 31 at the time is higher than the threshold a. Therefore, the regenerated energy accumulated in the accumulator 95 can be utilized when the load on the hydraulic actuator to which the hydraulic oil is supplied from the second main pump 31 is relatively great.

Still further, in the present embodiment, when the pressure accumulation condition is satisfied, the unloading valve 36 is fully closed. Accordingly, when the pressure accumulation condition is satisfied, bleed-off through the unloading line 35 is interrupted, and thereby the regenerated energy can be accumulated.

Embodiment 2

Figure 3:
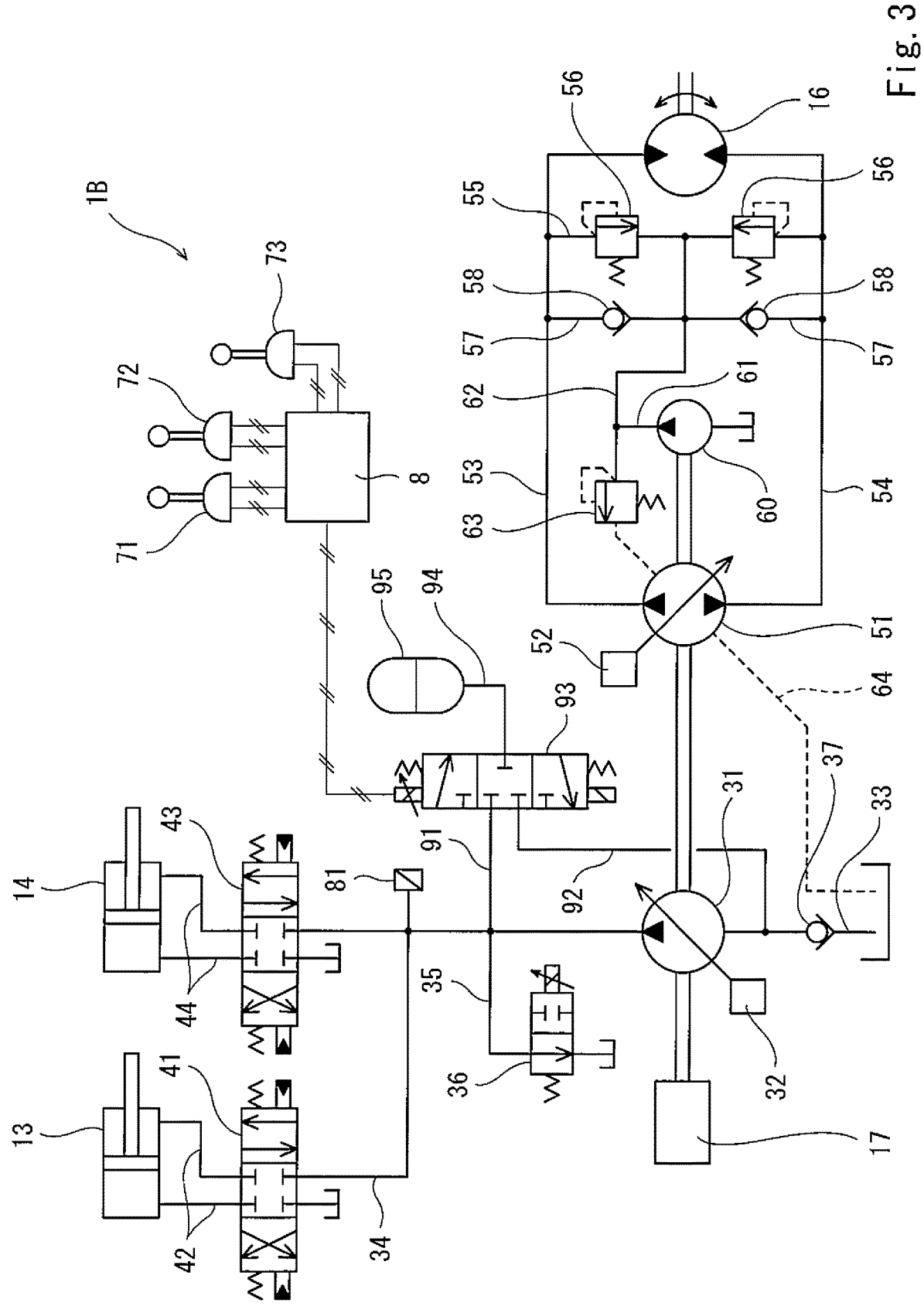
FIG. 3 shows a schematic configuration of a hydraulic drive system of a construction machine according to Embodiment 2 of the present invention.

FIG. 3 shows a hydraulic drive system 1B of a construction machine according to Embodiment 2 of the present invention. It should be noted that, in the present embodiment, the same components as those described in Embodiment 1 are denoted by the same reference signs as those used in Embodiment 1, and repeating the same descriptions is avoided.

In the present embodiment, a hydraulic circuit including only one main pump that supplies pressurized oil, i.e., a hydraulic circuit including a less number of components and being suited for a small-sized hydraulic excavator, is constructed. Specifically, in the hydraulic drive system 1B, the hydraulic oil is supplied from one main pump 31 to all the hydraulic actuators except the turning motor 16. Also, in the present embodiment, the opening degree of the switching valve 93 when the switching valve 93 is in the pressure accumulation position is arbitrarily adjustable.

Further, in the present embodiment, the pressure accumulation condition is defined to include that a turning deceleration operation is performed alone, and that a turning deceleration operation is performed concurrently with another operation and the delivery pressure of the main pump 31 at the time is lower than a threshold β. The threshold β associated with the pressure accumulation condition is greater than or equal to the threshold α associated with the pressure release condition. That is, even when the turning deceleration operation is performed concurrently with another operation, if the delivery pressure of the main pump 31 is higher than the threshold β, the switching valve 93 is positioned in the neutral position.

Similar to Embodiment 1, when the pressure accumulation condition is satisfied, the controller 8 switches the switching valve 93 to the pressure accumulation position. When the pressure release condition is satisfied, the controller 8 switches the switching valve 93 to the pressure release position. When neither the pressure accumulation condition nor the pressure release condition is satisfied, the controller 8 switches the switching valve 93 to the neutral position. However, in the present embodiment, the control of the switching valve 93 and the unloading valve 36 when the pressure accumulation condition is satisfied is different from the control described in Embodiment 1.

When the turning deceleration operation is performed alone, the controller 8 fully closes the unloading valve 36, and maximizes the opening area of the switching valve 93.

When the pressure accumulation condition is satisfied, if the satisfied pressure accumulation condition is that the turning deceleration operation is performed concurrently with another operation and the delivery pressure of the main pump 31 at the time is lower than the threshold (3, the controller 8 controls the unloading valve 36, such that the opening area of the unloading valve 36 is adjusted to an opening area corresponding to the operation signal of this other operation. In addition, the controller 8 adjusts the opening area of the switching valve 93 in accordance with which one of the delivery pressure of the main pump 31 and the setting pressure of the accumulator 95 is higher than the other.

In a case where the delivery pressure of the main pump 31 is higher than the setting pressure of the accumulator 95, the controller 8 adjusts the opening area of the switching valve 93 in accordance with the pressure difference between the delivery pressure of the main pump 31 and the setting pressure of the accumulator 95. On the other hand, in a case where the delivery pressure of the main pump 31 is lower than the setting pressure of the accumulator 95, the controller 8 fully opens the switching valve 93 (i.e., maximizes the opening area of the switching valve 93) and concurrently decreases the opening area of the control valve corresponding to the aforementioned other operation.

Also in the present embodiment, similar to Embodiment 1, when the turning deceleration operation is performed alone, the switching valve 93 is switched to the pressure accumulation position, and when the turning deceleration operation is performed concurrently with another operation, the switching valve 93 is switched to the neutral position or the pressure accumulation position. Therefore, sufficient braking force can be obtained regardless of whether or not another operation different from a turning operation is performed. The regenerated energy accumulated in the accumulator 95 is utilized when the load on the hydraulic actuator to which the hydraulic oil is supplied from the main pump 31 is relatively great. Thus, the regenerated energy can be utilized efficiently.

It should be noted that the pressure accumulation condition may only be that a turning deceleration operation is performed alone. However, if the pressure accumulation condition is set as in the present embodiment, not only when the turning deceleration operation is performed alone, but also when the turning deceleration operation is performed concurrently with another particular operation (e.g., boom lowering operation), sufficient braking force can be obtained while accumulating the regenerated energy in the accumulator 95.

Other Embodiments

The present invention is not limited to the above-described embodiments. Various modifications can be made without departing from the scope of the present invention.

For example, the unloading valve 36 and the switching valve 93 can be combined together into a single valve.

REFERENCE SIGNS LIST 1A, 1B hydraulic drive system
10 construction machine
13 boom cylinder
14 arm cylinder
16 turning motor
21 first main pump
31 second main pump
23, 33 suction line
24, 34 delivery line
25, 35 unloading line
26, 36 unloading valve
37 check valve
51 over-center pump
52 regulator
53, 54 supply/discharge line
73 turning operation device
8 controller
91 pressure accumulation line
92 pressure release line
93 switching valve
95 accumulator

The invention claimed is:

1. A hydraulic drive system of a construction machine, the hydraulic drive system comprising:
    a turning operation device that outputs a turning operation signal corresponding to an inclination angle of an operating lever;
    a turning motor;
    a variable displacement over-center pump that is connected to the turning motor by a pair of supply/discharge lines in a manner to form a closed loop;
    a regulator that adjusts a tilting angle of the over-center pump;
    a main pump whose rotary shaft is coupled to a rotary shaft of the over-center pump, the main pump sucking hydraulic oil from a tank through a suction line provided with a check valve and supplying the hydraulic oil to a hydraulic actuator different from the turning motor through a delivery line;
    an accumulator that accumulates pressurized oil therein;
    a switching valve that is switched between a pressure accumulation position, in which the switching valve brings the accumulator into communication with the delivery line, a pressure release position, in which the switching valve brings the accumulator into communication with a portion of the suction line downstream of the check valve, and a neutral position, in which the switching valve shuts off the accumulator from the delivery line and the portion of the suction line downstream of the check valve; and
    a controller that controls the regulator and the switching valve, wherein
    the controller controls the regulator such that when a turning deceleration operation is performed, the tilting angle of the over-center pump decreases in accordance with decrease in the turning operation signal outputted from the turning operation device, and
    the controller:
        switches the switching valve to the pressure accumulation position when a pressure accumulation condition is satisfied, the pressure accumulation condition being defined to include that the turning deceleration operation is performed alone;
        switches the switching valve to the pressure release position when a pressure release condition is satisfied; and
        switches the switching valve to the neutral position when neither the pressure accumulation condition nor the pressure release condition is satisfied.

2. The hydraulic drive system of a construction machine according to claim 1, wherein
    the construction machine is a hydraulic excavator,
    the main pump is a plurality of main pumps, the plurality of main pumps comprising a first main pump and a second main pump, the first main pump supplying the hydraulic oil to a boom cylinder, the second main pump supplying the hydraulic oil to an arm cylinder, and the switching valve is connected to the delivery line of the second main pump by a pressure accumulation line, and connected to the suction line of the second main pump by a pressure release line.

3. The hydraulic drive system of a construction machine according to claim 2, wherein the pressure accumulation condition is defined to include that the turning deceleration operation is performed alone, and that the turning deceleration operation is performed concurrently with a boom lowering operation.

4. The hydraulic drive system of a construction machine according to claim 1, wherein the construction machine is a hydraulic excavator, and the main pump supplies the hydraulic oil to a boom cylinder and an arm cylinder.

5. The hydraulic drive system of a construction machine according to claim 4, wherein the pressure accumulation condition is defined to include that the turning deceleration operation is performed alone, and that the turning deceleration operation is performed concurrently with another operation and a delivery pressure of the main pump at the time is lower than a threshold.

6. The hydraulic drive system of a construction machine according to claim 5, wherein the pressure release condition is that the turning deceleration operation is not performed and the delivery pressure of the main pump at the time is higher than a different threshold from the threshold.

7. The hydraulic drive system of a construction machine according to claim 1, wherein the pressure release condition is that the turning deceleration operation is not performed and a delivery pressure of the main pump at the time is higher than a threshold.

8. The hydraulic drive system of a construction machine according to claim 1, wherein the main pump is a variable displacement pump whose minimum delivery flow rate is set to be greater than zero, the hydraulic drive system further comprises an unloading valve provided on an unloading line that is branched off from the delivery line, and the controller fully closes the unloading valve when the turning deceleration operation is performed alone.

* * * * *